No. 648,072. Patented Apr. 24, 1900.
A. C. GRUBE.
FEATHER RENOVATOR.
(Application filed July 17, 1899.)
(No Model.) 2 Sheets—Sheet 1.
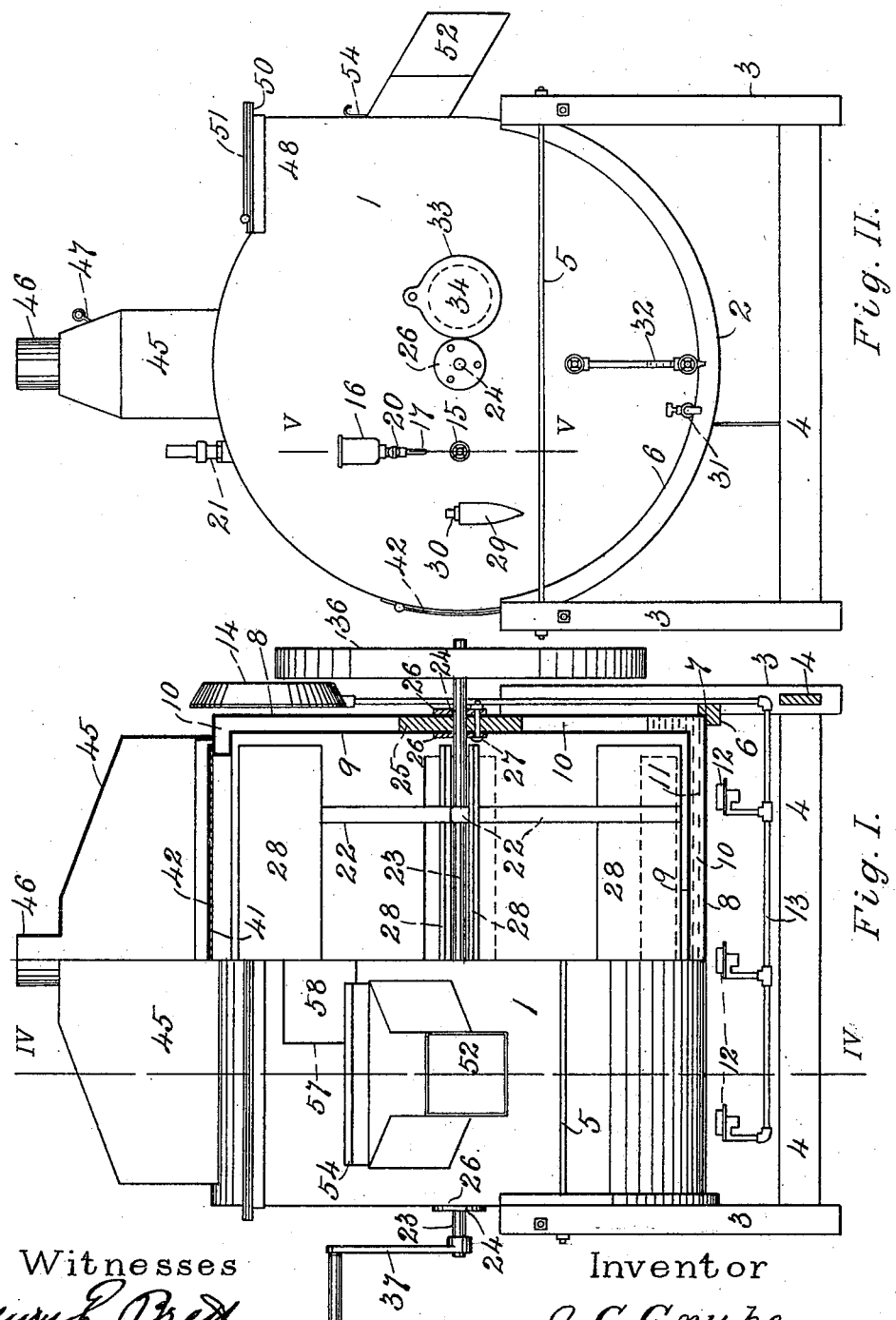
Witnesses
Henry E. Brett
J. A. Roelofz
Inventor
A. C. Grube
BY
ATTORNEYS

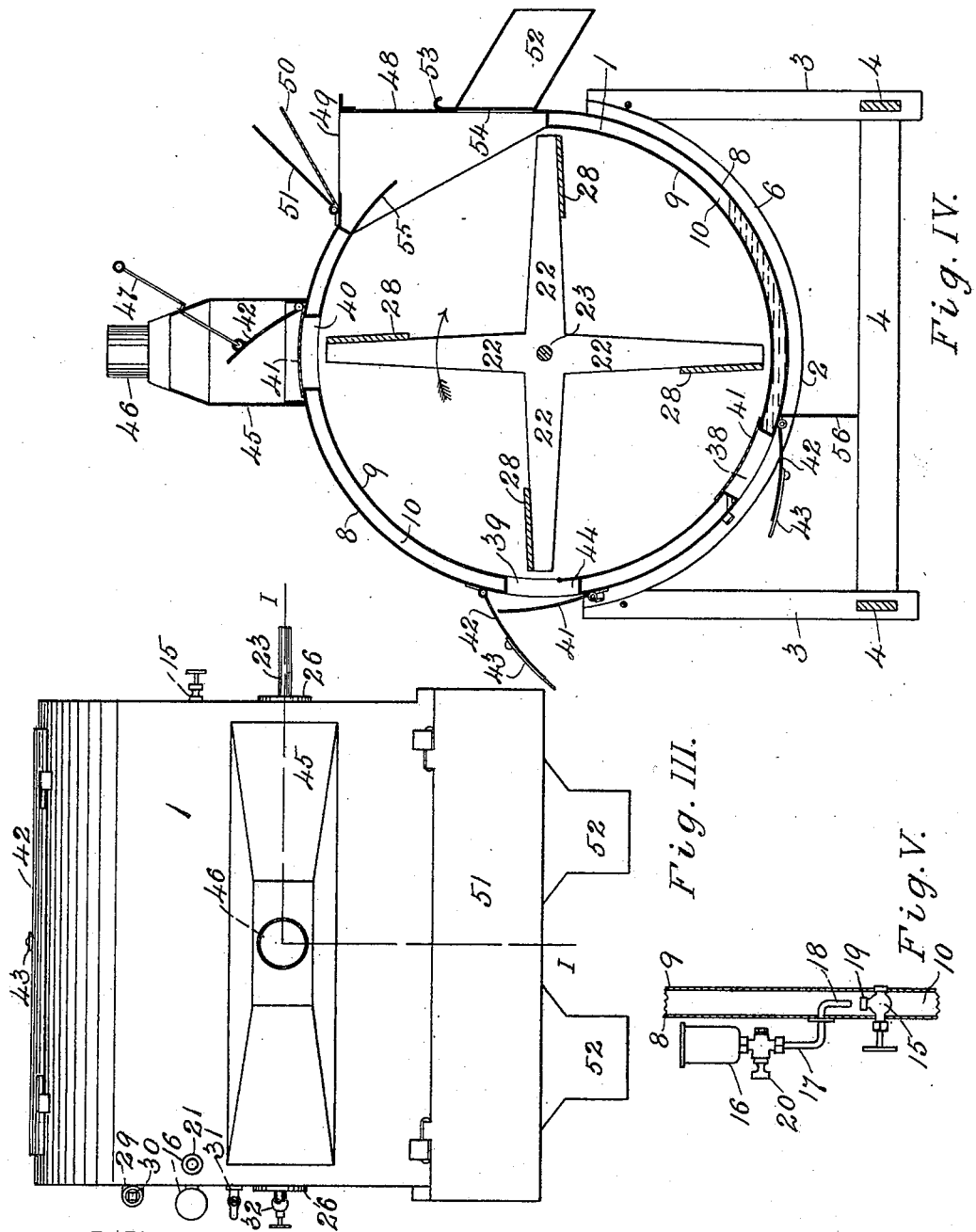

UNITED STATES PATENT OFFICE.

AARON C. GRUBE, OF PASADENA, CALIFORNIA.

FEATHER-RENOVATOR.

SPECIFICATION forming part of Letters Patent No. 648,072, dated April 24, 1900.

Application filed July 17, 1899. Serial No. 724,103. (No model.)

*To all whom it may concern:*

Be it known that I, AARON C. GRUBE, a citizen of the United States, residing at Pasadena, in the county of Los Angeles and State of California, have invented certain new and useful Improvements in Feather-Renovators, of which the following is a full, clear, and exact description, reference being had to the accompanying drawings, which form a part of this specification.

My invention relates to an improved machine for renovating or cleaning feathers; and my invention consists in certain features of novelty hereinafter described and claimed.

Figure I is in part a front elevation and in part a vertical section taken on line I I, Fig. III. Fig. II is an end elevation. Fig. III is a top view. Fig. IV is a transverse section taken on line IV IV, Fig. I. Fig. V is a detail vertical section of the steam-chamber and a side elevation of the disinfectant-cup.

Referring to the drawings, 1 represents a cylinder or drum, preferably formed of sheet metal — such, for instance, as galvanized iron — said drum resting in a cradle 2, said cradle consisting of vertical posts 3, connected at their bottoms by means of bars 4 and at their tops by means of rods 5.

6 represents bow-shaped frames having recesses 7, in which the edges of the cylinder rest.

The cylinder 1 is formed on its periphery and ends with an outer wall 8 and an inner wall 9, thus forming a chamber 10 for holding water, as shown at 11, and also for holding steam generated from the water.

12 represents a series of burners placed beneath the cylinder, said burners being supplied by suitable fuel — such as gas, gasolene, or oil — flowing through a pipe 13, which is connected to a suitable supply-tank 14 or may be connected with a gas-supply, if so desired. The chamber 10 extends around the major portion of the periphery of the cylinder and the ends of the same, thus forming a steam and water chamber covering most of the inner surface of the cylinder.

15 represents valves placed in the chamber 10 at the respective ends of the cylinder for the purpose of admitting steam from said chamber into the interior of the cylinder when the same is charged with feathers to be renovated. I provide a cup 16 for holding a disinfectant, said cup being supported by a pipe 17, which leads into the chamber 10, as shown at 18, the disinfectant passing from the pipe 17 into an open duct 19 of the valve 15, so that as the steam passes from the chamber 10 into the interior of the cylinder the disinfectant is carried with the steam into the cylinder.

20 represents a valve in the pipe 17 for controlling the supply of disinfectant material.

21 represents a safety-valve leading from the chamber 10 to the outside of the cylinder, through which any excess of steam may find its escape.

In renovating the feathers it is necessary to agitate them within the cylinder, and to accomplish this I provide a series of radial arms 22, mounted on a central shaft 23, said shaft being journaled at 24 to the ends of the cylinder.

25 represents disks surrounding the shaft 24 and placed within the chamber 10, said disks forming the double purpose of a partial bearing for the shaft 23 and brace to the cylinder of the chamber 10 and a packing to prevent the escape of steam from the chamber 10 around the shaft 24.

26 represents washers placed on each side of the walls of the chamber 10 and surrounding the shaft 24. 27 represents bolts passing through said washers, through the walls of the chamber 10, and through the disks 25, by which the various parts mentioned may be closely pressed together and prevent the escape of steam, as before mentioned.

28 represents blades on the arms 22, located near the outer ends of the same, for stirring up the feathers during the process of renovation.

29 represents a cup normally closed by a plug 30, through which water may be conducted to the interior of the chamber 10.

31 represents a drain-cock, and 32 an indicator.

33 represents a slide for normally closing an aperture 34, said aperture admitting sufficient air to the interior of the cylinder at the desired time in the process of renovating.

36 represents a balance-wheel on the shaft 24, and 37 a crank for operating the same. When found desirable, the crank 37 may be removed and a pulley placed on the shaft, whereby other power may be used. The cylinder 1 is provided with a series of openings 38, 39, and 40, situated at different points on its periphery to permit the escape of dirt and dust during the operation of cleaning the feathers. Said openings are provided with screens 41, which while permitting the passing of dirt and dust will not permit the escape of the feathers from the cylinder.

42 represents solid hinged doors for closing the apertures 38 when desired, said doors being fitted with latches 43 for holding them in their closed position.

At the aperture 39 I provide a cup or trough 44 for catching any foreign substance mixed with the feathers that is too large to pass through the screens 41.

45 represents a hood covering the upper aperture 40, said hood being connected to a pipe 46, by which means the heated air and gases are permitted to escape when the door 42 has been raised. (See Fig. IV.)

47 represents a hand-rod extending through the hood 45 for manipulating the door 42.

48 represents a hopper connected with the cylinder 1 and having an opening 49 at its upper end, through which the feathers are passed to the cylinder, said opening 49 being controlled by means of a hinged screen 50 and a hinged door 51.

52 represents a chute leading from the interior of the cylinder, over which pillow-cases or other articles may be placed, into which the renovated feathers may be discharged.

53 represents vertical slides for closing the apertures 54, leading into the chutes 52, during the time the feathers are being renovated.

55 represents a deflector extending into the hopper 48, which directs the feathers toward the chutes 52.

56 represents a screen extending from the bottom of the cylinder downwardly to prevent any danger of the flame from the burners 12 passing into the cylinder when the lower door 42 has been opened.

My device is operated as follows: The feathers are first placed within the cylinder through the hopper 48, the screen-doors being closed to the various apertures and the solid doors being open. The shaft 23 is rotated, the feathers being stirred up by the blades and the dust and dirt permitted to escape in dry form through the apertures 38, 39, and 40. After the dust has been discharged from the feathers the doors are all closed and steam admitted to the interior of the cylinder through the valves 15. After the feathers have been sufficiently steamed the solid doors are opened to permit the escape of the hot air and exhaust-steam and to cool the feathers. After the feathers have become sufficiently cooled and dried the doors are all closed, the air-slide 33 opened, and the shaft 23 rotated with the stirrer, the air carrying the feathers out through the chute 52 into the receptacles connected therewith.

57 represents an opening in front of the cylinder for the purpose of observation, said opening being preferably inclosed with glass 58.

I claim as my invention—

1. In a feather-renovating machine, the combination of a detached cradle, a removable hollow cylindrical drum resting on the cradle, a water and steam chamber within the cylindrical drum, means connected with the detached cradle for heating the cylindrical drum, apertures leading to and from the drum and a vertical screen extending downwardly from the bottom of the drum to prevent the flame from reaching the interior of the drum, substantially as set forth.

2. In a feather-renovating machine, the combination of a hollow body, a detached support for the body, an agitating device, a water and steam chamber within the body, means for heating the water secured to the detached support, apertures leading to the interior of the body, and screens and solid doors adapted to close said apertures, substantially as set forth.

3. In a feather-renovating machine, the combination of a cylindrical body having a central chamber, means for heating water in the body, apertures leading to the interior of the body and a cup in one of said apertures for catching foreign substances cleaned from the feathers and too large to pass through the screens, said cups being formed by an open extension of the inner wall 9, substantially as set forth.

4. In a feather-renovating machine, the combination of a hollow cylindrical body having a detached support, means for heating the body, a hopper, an opening leading to the hopper, a screen and solid door for closing said opening, a discharge-chute leading from the body, a slide for closing said chute, an opening in the body for the discharge of heat and gases, a screen and solid door for closing said opening, a hood resting over said opening and a pipe leading from the hood, substantially as set forth.

5. In a feather-renovating machine, the combination of a double-walled body resting on a detached support, means for charging the space between the walls with water, valves for admitting steam into the interior of the body, an agitating device, apertures for the discharge of foreign substances from the feathers, a hopper, a discharge-chute leading from the body and a deflector for directing the feathers toward the discharge-chute, substantially as set forth.

6. In a feather-renovating machine, the combination of a cylindrical body having an interior chamber, inner and outer walls composing the body, a water and steam chamber between said walls, a disinfectant-cup, a pipe leading from the cup to the water and steam chamber and a valve for admitting steam and disinfectant to the interior of the body, substantially as set forth.

AARON C. GRUBE.

Witnesses:
 EMMET H. WILSON,
 JAS. E. KNIGHT.